United States Patent
Horiuchi

(10) Patent No.: US 10,557,984 B2
(45) Date of Patent: Feb. 11, 2020

(54) DISPLAY DEVICE

(71) Applicant: Funai Electric Co., Ltd., Osaka (JP)

(72) Inventor: Hirofumi Horiuchi, Daito (JP)

(73) Assignee: Funai Electric Co., LTD., Osaka (JP)

( * ) Notice: Subject to any disclaimer, the term of this patent is extended or adjusted under 35 U.S.C. 154(b) by 0 days.

(21) Appl. No.: 15/987,985

(22) Filed: May 24, 2018

(65) Prior Publication Data

US 2018/0341056 A1   Nov. 29, 2018

(30) Foreign Application Priority Data

May 24, 2017 (JP) .................................. 2017-102883

(51) Int. Cl.
| | | |
|---|---|---|
| G09F 13/04 | (2006.01) | |
| G09F 13/08 | (2006.01) | |
| F21V 8/00 | (2006.01) | |
| G02F 1/1335 | (2006.01) | |
| G02F 1/133 | (2006.01) | |
| G02F 1/1333 | (2006.01) | |
| H04N 5/64 | (2006.01) | |

(52) U.S. Cl.
CPC ......... *G02B 6/0055* (2013.01); *G02B 6/0046* (2013.01); *G02F 1/13306* (2013.01); *G02F 1/133308* (2013.01); *G02F 1/133553* (2013.01); *G02F 1/133603* (2013.01); *G02F 1/133615* (2013.01); *H04N 5/64* (2013.01); *G02B 6/0068* (2013.01); *G02F 2001/13332* (2013.01); *G02F 2001/133314* (2013.01); *G02F 2001/133601* (2013.01)

(58) Field of Classification Search
CPC . G02B 6/0055; G02B 6/0096; G02F 1/13306; G02F 1/133308; G02F 1/133553; G02F 1/133603; G02F 1/133615
USPC .................................................. 362/97.1–97.4
See application file for complete search history.

(56) References Cited

U.S. PATENT DOCUMENTS

| 5,453,855 A | * | 9/1995 | Nakamura | ........... G02B 6/0051 349/58 |
| 2005/0185394 A1 | * | 8/2005 | Sakamoto | ............ G02B 6/0026 362/133 |
| 2015/0301269 A1 | | 10/2015 | Nishitani et al. | |

FOREIGN PATENT DOCUMENTS

JP    2015-102579 A    6/2015

OTHER PUBLICATIONS

Extended Search Report issued in European Application No. 18173079.7, dated Oct. 23, 2018 (7 pages).

* cited by examiner

*Primary Examiner* — Jason M Han
(74) *Attorney, Agent, or Firm* — Osha Liang LLP

(57) ABSTRACT

A display device includes a display screen, a reflective sheet disposed opposite the display screen and that reflects irradiated light toward the display screen, a plurality of light emitters disposed at one side of the reflective sheet and that irradiates light to different reflective regions of the reflective sheet, and a controller that adjusts an amount of light generated in each of the plurality of light emitters.

16 Claims, 10 Drawing Sheets

800-800 Cross Section

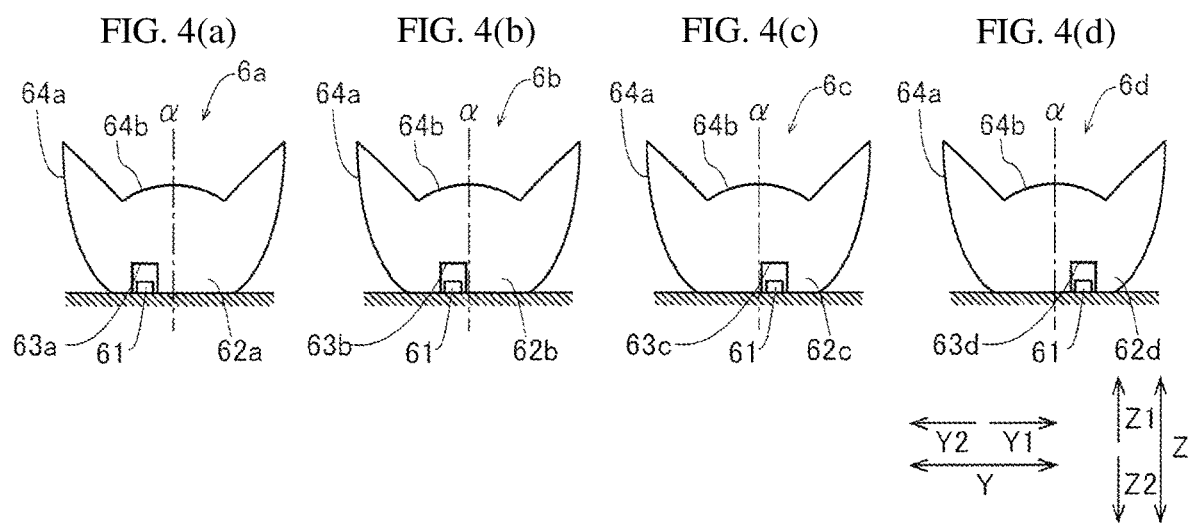

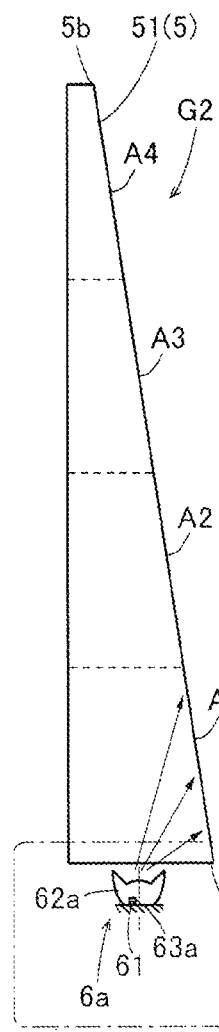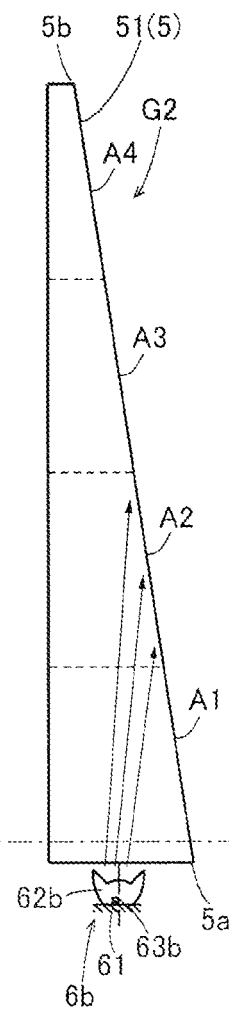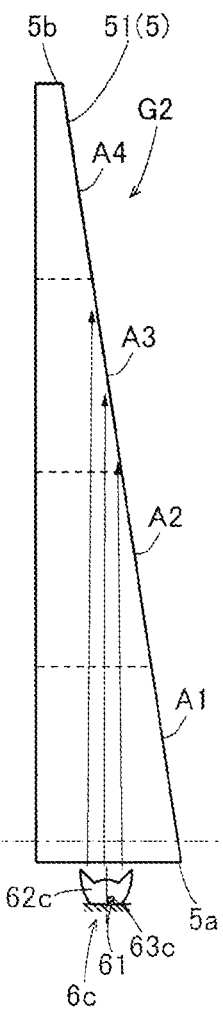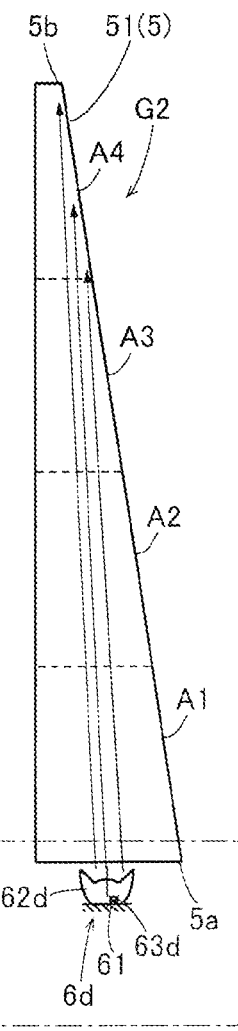

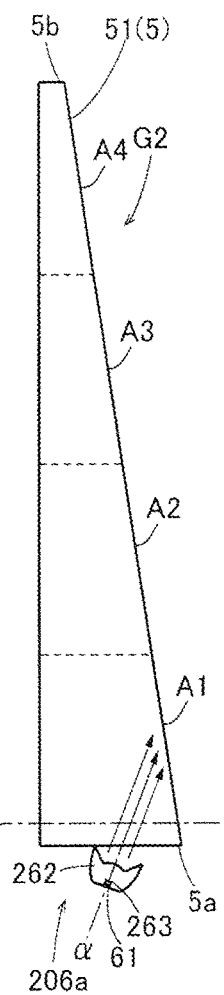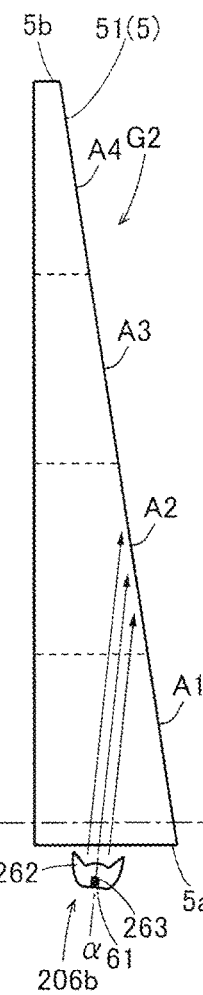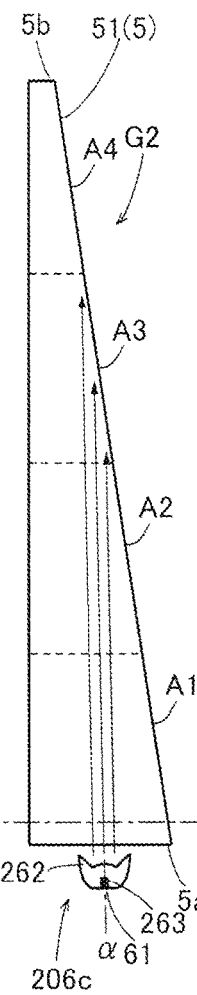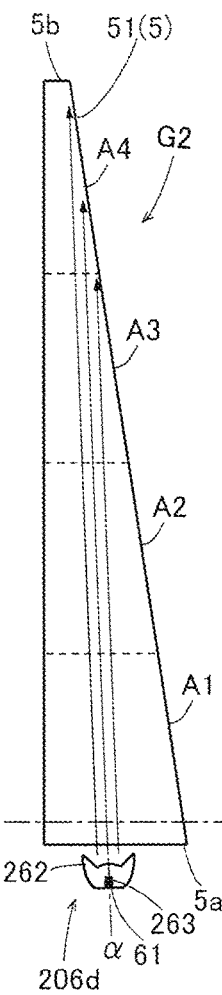

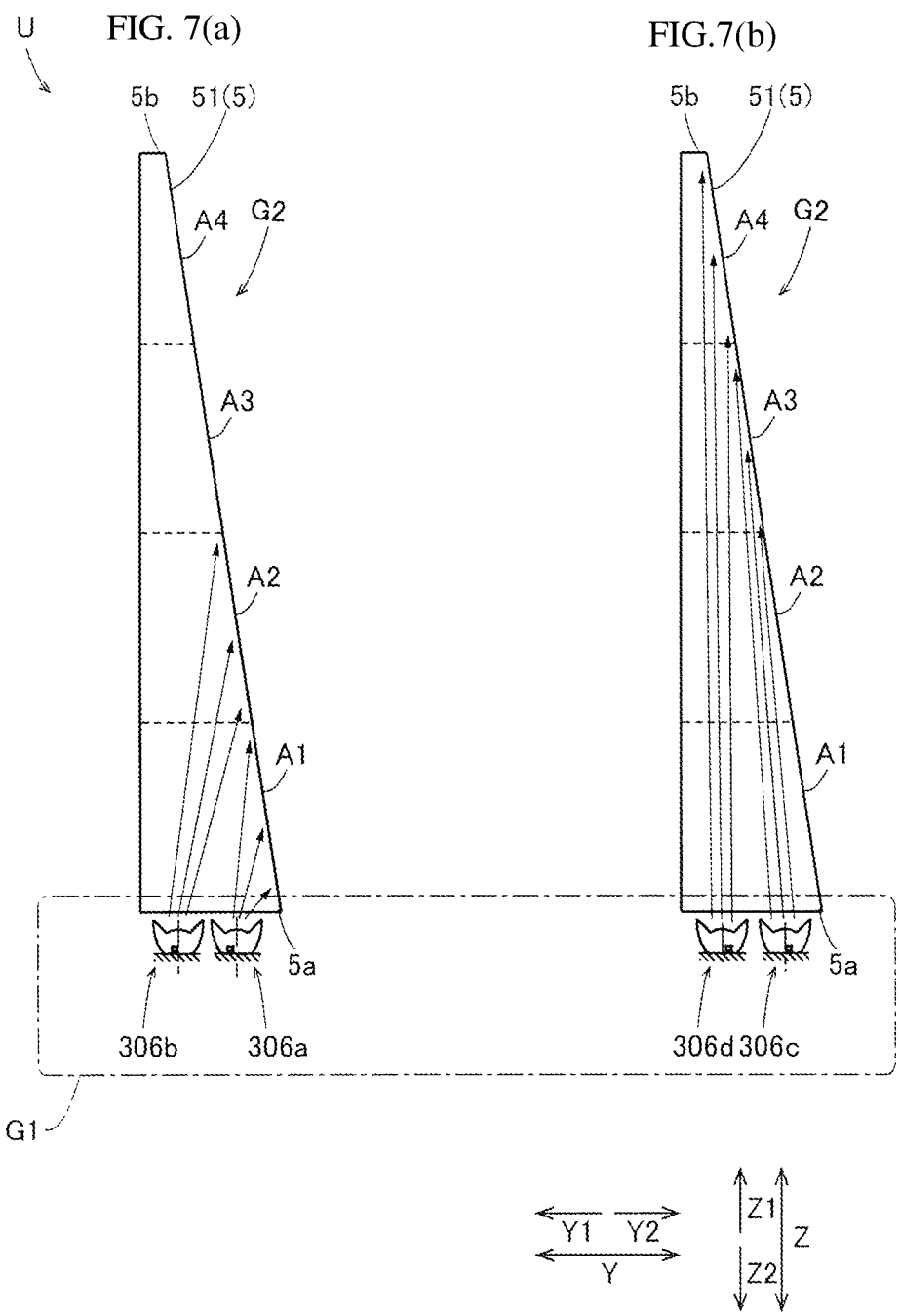

DISPLAY DEVICE

CROSS-REFERENCE TO RELATED APPLICATIONS

This patent application is based upon and claims the benefit of priority to Japanese Patent Application No. 2017-102883 filed May 24, 2017, which is incorporated herein by references in its entirety.

BACKGROUND

Technical Field

This invention relates to a display device, and particularly relates to a display device provided with a light emitting part and a reflective part.

Related Art

Conventionally, a display device is known, such as a liquid crystal display device provided with a light emitting part (light source) and a reflecting art (reflective film) (for example, see patent literature 1).

In patent literature 1, a liquid crystal display device is disclosed provided with a display part having a display surface, a reflective film, a light guide plate, and a plurality of a light source disposed on an end part of the light guide plate (near the end part of the reflective film).

The liquid crystal display device is configured to guide light from the plurality of the light source to the entire surface of the display surface using the light guide plate and the reflective film.

PATENT LITERATURE

[Patent Literature 1] Japanese Unexamined Patent Application Publication No. 2015-102579

SUMMARY

However, in the liquid crystal display device of said patent literature 1, light is guided to the entirety of the display surface by diffusion on the light guide plate and reflection on the reflective film, and it is considered that the brightness cannot be sufficiently controlled for each display surface (display surface of predetermined range) because the light guiding position cannot be sufficiently controlled. Therefore, it may not be possible to carry out local dimming control itself for controlling the brightness for each display surface.

One or more embodiments of the present invention provide a display device that can carry out local dimming control by controlling the plurality of light emitting parts disposed near the end part of the reflective part.

A display device according to one or more embodiments of the present invention is provided with: a display part; a reflective part disposed opposite the display part for reflecting irradiated light to the display part side; a plurality of light emitting parts disposed near an end part of the reflective part to be able to irradiate light to different reflective regions of the reflective part; and a control part for carrying out a control to adjust the amount of light generated in each of the plurality of light emitting parts.

The display device according to one or more embodiments of the present invention, as described above, is provided with a plurality of light emitting parts disposed near an end part of a reflective part to be able to irradiate light to different reflective regions of the reflective part; and a control part for carrying out a control to adjust the amount of light generated in each of the plurality of light emitting parts. Thus, because the light from the light emitting part can be irradiated to different reflective regions, it is possible to adjust the light irradiated (amount) to each reflective region by adjusting the amount of light generated in each light emitting part using the control part. As a result, it is possible to adjust the brightness of each display surface in a predetermined range of the display part for each reflective region. That is, it is possible to carry out a local dimming control.

The display device according to one or more embodiments of the present invention may have a plurality of light emitting parts configured to irradiate light to the reflective region so that the reflective regions do not substantially overlap each other. According to such a configuration, it is possible to adjust the irradiation (amount) of light on the reflective region with almost no influence of light from the other adjacent reflective regions. As a result, it is possible to effectively carry out a local dimming control.

The display device according to one or more embodiments of the present invention may have the reflective part configured so that the light irradiated from the light emitting part is irradiated to the reflective regions of the reflective part via a space without passing through a light guide plate. According to such a configuration, since the display device is not provided with a light guide plate, the device configuration can be simplified.

In this case, the reflective part may be inclined from one end part of the reflective part on the light emitting part side toward the other end part on the opposite side of the one end part to approach the display part. According to such a configuration, compared to when the reflective part is disposed parallel to the display surface, it can easily irradiate light from the plurality of light emitting parts to the reflective region and can effectively reflect light to the display part side because the reflective part can be disposed to face the light emitting part side.

In the configuration described above in which light is irradiated to the reflective region of the reflective part via a space without passing through a light guide plate, the reflective part may be provided with a reflective part main body disposed along the display part for reflecting light to the display part side; and a partition wall for defining the reflection region of the reflective part, extending from the reflective part main body towards the display part, and extending from the light emitting part along an emission direction of light. According to such a configuration, the light flow to the reflective region on the other side from the reflective region on one side of the partition wall can be suppressed using the partition wall.

The display device according to one or more embodiments of the present invention may have a reflective region that is disposed in a matrix in a surface direction parallel to the display surface of the display part; and is provided with a unit configuration disposed in plurality in the first direction, including a reflective region group composed of a plurality of reflective regions aligned in a second direction perpendicular to a first direction in which an end part of the reflective part on the light emitting part side among the surface direction extends, and a light emitting part group disposed near the end part of the reflective region group, composed of a plurality of light emitting parts for irradiating light to the light reflective region group. According to such a configuration, since the unit configuration is disposed in plurality in the first direction to carry out a local dimming control. Thus, it is possible to effectively suppress variation in the brightness and darkness (light and dark) on the display surface.

In this case, the light emitting part is provided with a light source part for generating light and a lens for guiding the light from the light source part to the reflective part; and the plurality of light emitting parts is configured to vary the light emission direction by respectively varying light distribution characteristics of the lens to the light source part or respectively varying the installation angles of the light emission part itself, and irradiating light to the differing reflective regions of the reflective part. According to such a configuration, when the distribution of the characteristic of the lens is varied for the light source part, each light emitting part can be placed to a similar position. Otherwise, when the installation angles of the light emitting parts themselves are varied with each other, the light can be irradiated to reflective regions differing with each other using a light emitting part of a similar configuration. Thus, the configuration of the plurality of light emitting parts can be simplified.

The display device according to one or more embodiments of the present invention may have the light emitting part provided aligned in plurality in a direction perpendicular to the display surface of the display part. According to such a configuration, the display device can be configured to irradiate light from one light emitting part near the reflective part to a reflective region near one light emitting part in a direction perpendicular to the display surface of the display part, and to irradiate light from another light emitting part far from the reflective part to a reflective region far from another light emitting part. Thus, compared to when irradiating light from one light emitting part near the reflective part to a far reflective region and irradiating light from another light emitting part far from the reflective part to a nearby reflective region, it is possible to reduce the difference between the angle of incidence of light incident on the reflective part from one light emitting part and the angle of incidence of light incident on the reflective part from another light emitting part. Thus, it is possible to uniformly guide light reflected from the reflective regions to a predetermined range on the display surface.

In this case, each of the plurality of the light emitting part is configured to irradiate light in a direction substantially parallel to the display surface of the display part. According to such a configuration, the light reflected from the reflective region can be more uniformly guided to a predetermined range on the display surface because the angle of incidence to the reflective part of light emitted from the plurality of light emitting parts can be aligned.

In the configuration in which the light emitting part is provided aligned in plurality in a direction perpendicular to the display surface of the display part, the light emitting part may include a light source part for generating light and a lens for guiding the light from the light source part to the reflective part; and the lenses of the plurality of light emitting parts are integrally formed by being connected to each other in a direction perpendicular to the display surface of the display part. According to such a configuration, the device configuration can be simplified because the lenses of the plurality of the light emitting device can be integrally formed.

In the display device according to one or more embodiments of the present invention, the light emitting part may include a first light emitting part provided on one side of the end parts facing each other on the reflective part and a second light emitting part provided on the other side. According to such a configuration, compared to when the light emitting part is provided only on one side of the end parts facing each other on the reflective part, it is possible to shorten the maximum light guiding distance from the light emitting part to the reflective region. As a result, it is possible to suppress energy loss in the light.

According to one or more embodiments of the present invention, it may be possible to provide a display device that can carry out a local dimming control by controlling the plurality of light emitting parts disposed near the end part of the reflective part.

BRIEF DESCRIPTION OF THE DRAWINGS

FIGS. 4(a)-4(d) are side surface views illustrating each of the plurality of light emitting parts of the television device according to one or more embodiments of the present invention.

FIGS. 5(a)-5(d) are side surface views illustrating the distribution characteristics of each of the plurality of light emitting parts of the television device according to one or more embodiments of the present invention.

FIGS. 6(a)-6(d) are side surface views illustrating the distribution characteristics of each of the plurality of light emitting parts of the television device according to one or more embodiments of the present invention.

FIGS. 7(a)-7(b) are side surface views illustrating the distribution characteristics of each of the plurality of light emitting parts of the television device according to one or more embodiments of the present invention.

DETAILED DESCRIPTION

Embodiments of the present invention will be described below with reference to drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The configuration of a television device 100 according to one or more embodiments of the present invention will be described with reference to FIG. 1 to FIG. 5(d). Note that the television device 100 is one example of the "display device" according to one or more embodiments of the present invention.

Figure 1:
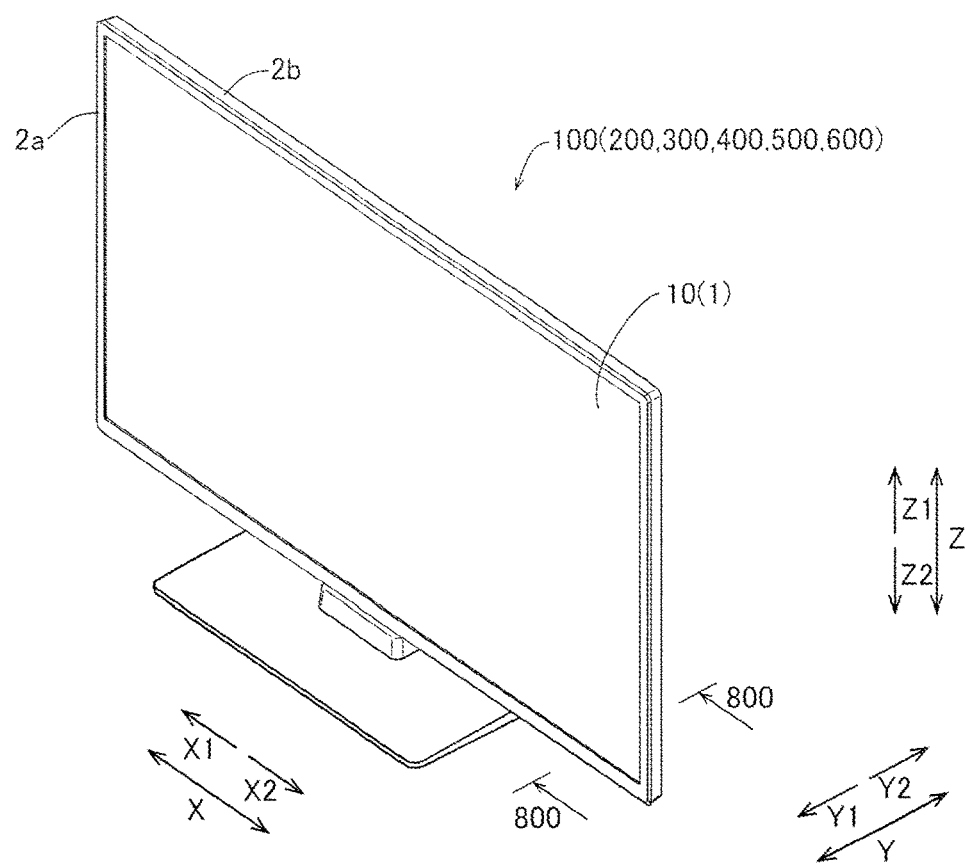
FIG. 1 is an overall perspective view of a television as viewed from the front according to one or more embodiments of the present invention.
Figure 2:
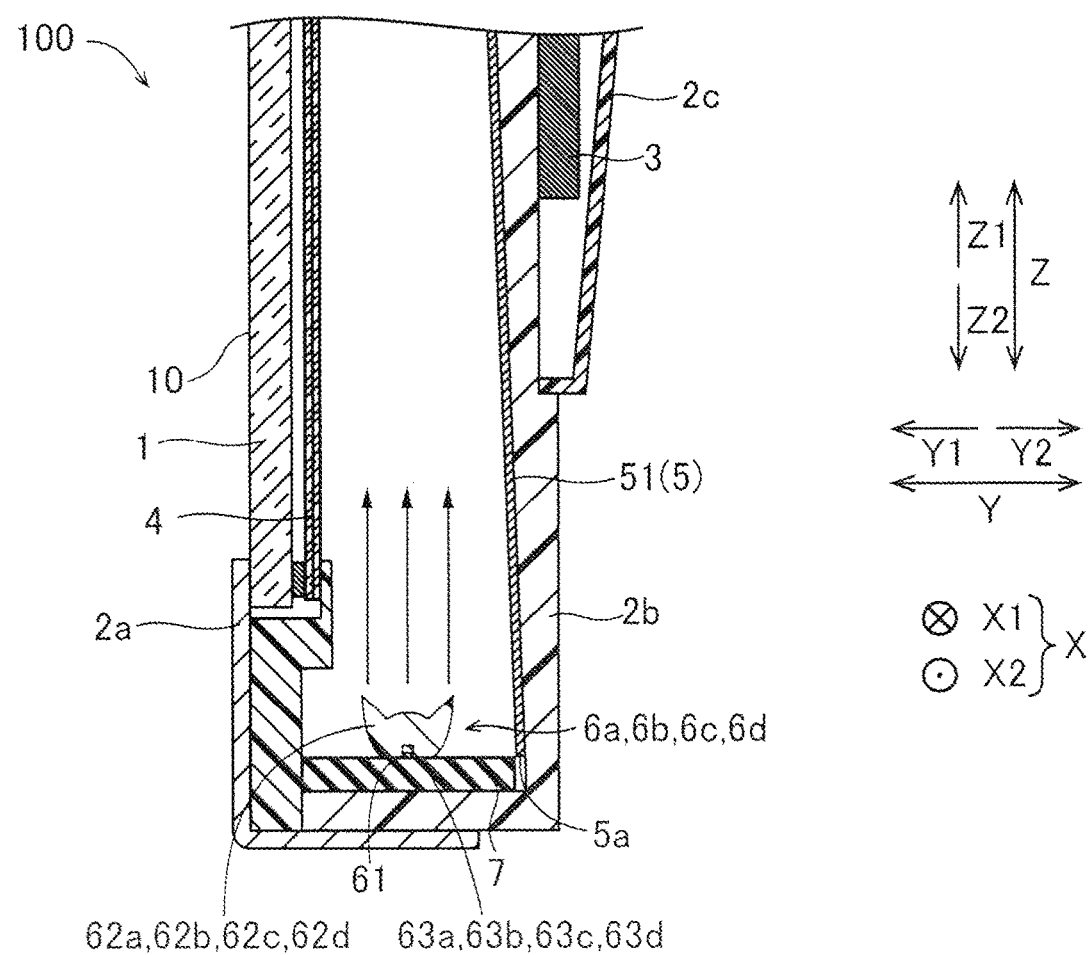
FIG. 2 is a cross-sectional view along the 800-800 line in FIG. 1 illustrating the television device according to one or more embodiments of the present invention.

The television device 100 according to one or more embodiments of the present invention, as illustrated in FIG. 1, is provided with a liquid crystal display part 1 having a display surface 10 for displaying an image, a front cabinet (front side housing) 2a, and a rear cabinet (back side housing) 2b for storing the display part 1. Furthermore, the television device 100, as illustrated in FIG. 2, has a control part 3, an optical sheet 4 disposed behind the display part 1 facing the display part 1, a sheet-shaped reflective sheet 5 disposed behind the optical sheet 4 and the display part 1 facing the display part 1, a light emitting part 6a, 6b, 6c, and 6d disposed near the lower end part 5a of the reflective sheet 5, and a substrate 7 whereon the light emitting parts 6a to 6d are installed. Note that the reflective sheet 5 is one example of the "reflective sheet" according to one or more embodiments of the present invention.

The television device 100 is not provided with a light guide plate, unlike a general television device. That is, the television device 100 is configured so that light emitted from the light emitting parts 6a to 6d is directly irradiated to reflective regions A1 to A4, described later, of the reflective sheet 5 via a space without passing through a light guide plate.

Hereinafter, the display surface 10 side of the television device 100 is described as the front side (Y1 direction), the opposite direction of the front side is described as the back side (Y2 direction), and the direction along the front side and back side is described as the longitudinal direction (Y direction). The longitudinal direction (Y direction) is a direction perpendicular to the display surface 10 of the display part 1. Furthermore, the direction perpendicular to the longitudinal direction (Y direction) and the vertical direction (Z direction), is described as the width direction (X direction). The vertical direction (Z direction) and the width direction (X direction) are surface directions parallel to the display surface 10 of the display part 1. Note that the width direction (X direction) is one example of the "second direction" according to one or more embodiments of the present invention. Furthermore, the vertical direction (Z direction) is one example of the "first direction" according to one or more embodiments of the present invention.

As illustrated in FIG. 1, the front cabinet 2a is provided to cover the peripheral part of the display part 1 from the front surface side. Furthermore, the front cabinet 2a has a rectangular opening for exposing the display surface 10 to the front side. The rear cabinet 2b (see FIG. 3) is provided to cover the back surface side of the display part 1. As illustrated in FIG. 2, a back surface cover 2c is provided in the rear cabinet 2b. The back surface cover 2c is configured to be attachable to the rear cabinet 2b from the back side (Y2 direction). A space part is provided inside the rear cover 2c.

The control part (control substrate) 3 is disposed in the space part on the inside of the back surface cover 2c. The control part 3 is configured having at least a CPU, ROM, or RAM. The control part 3 is configured to drive each part of the television device 100. For example, the control part 3 is configured carry out a control (local dimming control) for changing the brightness of each reflective region A1 to A4, described later, of the reflective sheet 5 and adjusting the brightness of each display surface 10 in a predetermined range by adjusting the amount of light generated by each light emitting part 6a to 6d. As a result, it is possible to make the difference between the bright portion and the dark portion more prominent in the image display in the display part 1. That is, a higher contrast (difference between bright and dark) can be obtained.

The optical sheet 4 is provided in plurality, in which the optical sheet 4 is a diffusion plate or another functional sheet or the like. The optical sheet 4 has a function for more efficiently transmitting the light reflected by the reflective sheet 5 to the display part 1.

Figure 3:
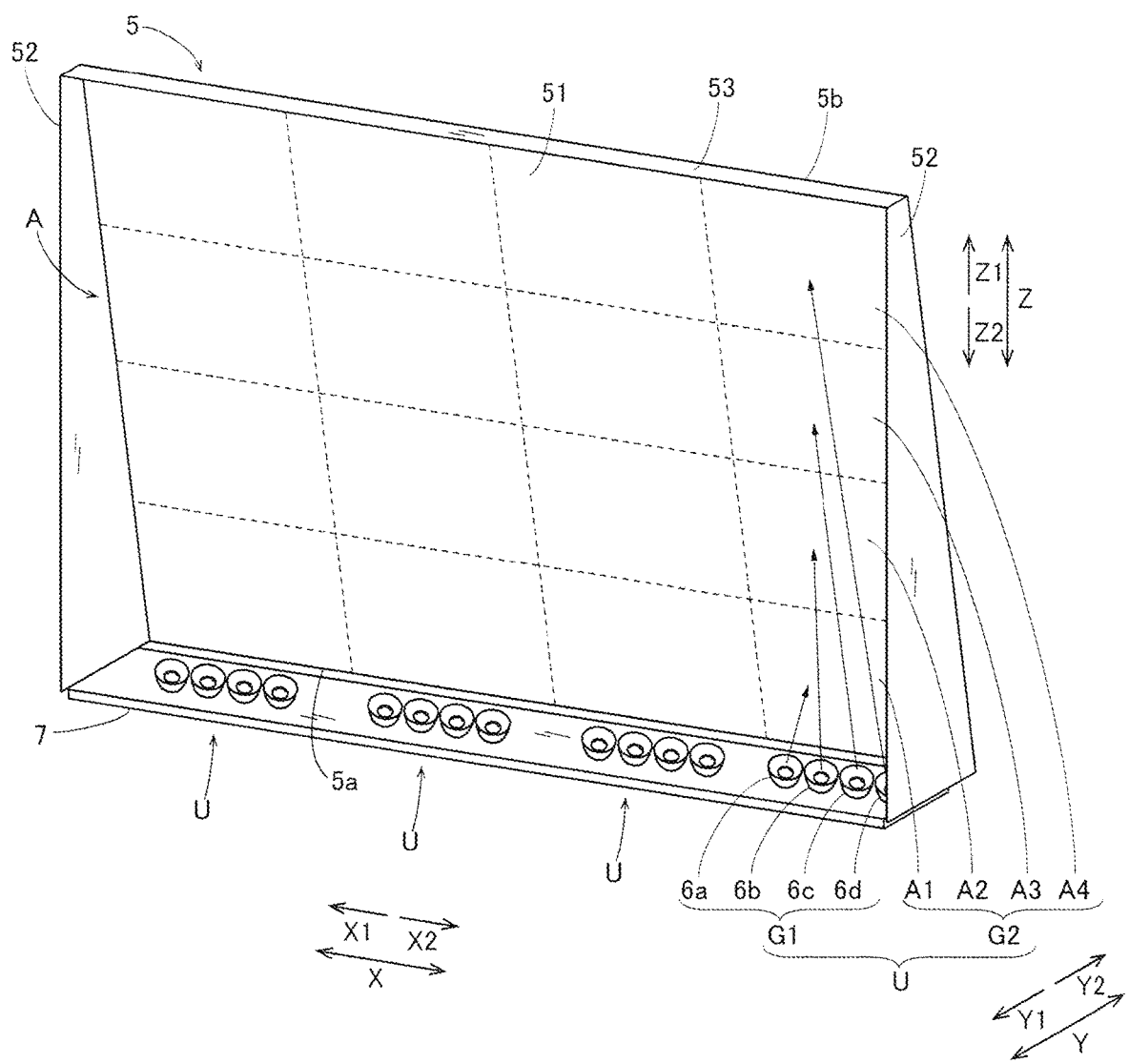
FIG. 3 is a perspective view illustrating a reflective sheet and a light emitting part of the television device according to one or more embodiments of the present invention.

The reflective sheet 5 has a reflective surface for reflecting light to the display part 1 side (front side). Furthermore, as illustrated in FIG. 3, the reflective sheet 5 is inclined from the lower end part 5a of the light emitting part 6a to 6d side towards the upper end part 5b on the opposite side of the lower end part 5a so as to be closer to the display surface 10 (see FIG. 2). That is, the reflective sheet 5 is inclined so that the upper end part 5b is positioned more to the front side (Y1 direction side) than the lower end part 5a. Note that the lower end part 5a is one example of a part disposed at "one side" of the reflective sheet according to one or more embodiments of the present invention. Furthermore, the upper end part 5b is one example of a part disposed at "an opposite side" of the reflective sheet according to one or more embodiments of the present invention. From FIG. 3 onwards, the inclination angle of the reflection sheet 5 is exaggerated for ease of understanding.

The reflective sheet 5 has a reflective sheet main body 51 disposed on the back side (Y2 direction side) of the display part 1 along the display part 1, a side part 52 provided to extend to the front from both end parts in the width direction (X direction) of the reflective sheet main body 51, and an upper part 53 provided to extend to the front from the upper end part 5b of the reflective sheet main body 51. Note that the reflective sheet main body 51 is one example of the "main body" according to one or more embodiments of the present invention.

The light emitting parts 6a to 6d are disposed near the lower end part 5a of the reflective sheet 5 aligned linearly in the width direction (X direction).

As illustrated in FIG. 4(a), the light emitting part 6a is provided with a light source part (LED package) 61 for generating light, and a lens 62a for guiding the light from the light source part 61 to the reflective sheet 5. The lens 62a includes a recess 63a for disposing the light source part 61 on the substrate 7 side. The recess 63a is disposed on the front side (Y2 direction) to the central axis a extending in the Z direction of the lens 62b. As a result, as illustrated in FIG. 5(a), the light emitting part 6a is configured to emit light upwards (Z1 direction) and towards the central axis a side (back side) of the light source part 61. Furthermore, the light emitting part 6a is configured to irradiate light to the reflective region A1 positioned near the lower end of the reflective sheet 5.

As illustrated in FIG. 4(b), the light emitting part 6b is provided with a light source part 61 for generating light, and a lens 62b for guiding light from the light source part 61 to the reflective sheet 5. The lens 62b includes a recess 63b for disposing the light source part 61 on the substrate 7 side. The recess 63b is disposed on the front side (Y2 direction) to the central axis a of the lens 62b. Furthermore, the recess 63b is disposed in a position closer to the central axis a than the recess 63a of the lens 62a. As a result, as illustrated in FIG. 5(b), the light emitting part 6b is configured to emit light upwards (Z1 direction) and towards the central axis a side (back side) of the light source part 61. Furthermore, the light emitting part 6b is configured to irradiate light to the reflective region A2 of the reflective sheet 5 positioned adjacent to the upper side (Z1 direction) of the reflective region A1.

As illustrated in FIG. 4(c), the light emitting part 6c is provided with a light source part 61 for generating light, and a lens 62c for guiding light from the light source part 61 to the reflective sheet 5. The lens 62c includes a recess 63c for disposing the light source part 61 on the substrate 7 side. The recess 63c is disposed on the back side (Y1 direction) to the central axis a of the lens 62c. As a result, as illustrated in FIG. 5(c), the light emitting part 6c is configured to emit light upwards (Z1 direction) and towards the central axis a side (front side) of the light source part 61. Furthermore, the light emitting part 6c is configured to irradiate light to the reflective region A3 of the reflective sheet 5 positioned adjacent to the upper side (Z1 direction) of the reflective region A2.

As illustrated in FIG. 4(d), the light emitting part 6d is provided with a light source part 61 for generating light, and a lens 62d for guiding light from the light source part 61 to the reflective sheet 5. The lens 62d includes a recess 63d for disposing the light source part 61 on the substrate 7 side. The recess 63d is disposed on the back side (Y1 direction) to the central axis a of the lens 62d. Furthermore, the recess 63d is disposed in a position closer to the central axis a than the recess 63c of the lens 62c. As a result, as illustrated in FIG. 5(d), the light emitting part 6c is configured to emit light upwards (Z1 direction) and towards the central axis a side (front side) of the light source part 61. Furthermore, the light emitting part 6d is configured to irradiate light to the reflective region A4 of the reflective sheet 5 positioned adjacent to the upper side (Z1 direction) of the reflective region A3.

As illustrated in FIGS. 5(a) to 5(d), the reflective regions A1 to A4 are generally disposed directly above the light emitting parts 6a to 6d.

As illustrated in FIGS. 4(a) to 4(d), the lenses 62a to 62d are collimator lenses that reflect and refract light from the light source part 61 to make the light substantially parallel to each other. Specifically, the lenses 62a to 62d have a refractive surface 64a disposed on the upper side (Z1 direction) of the light source part 61 and a reflective surface 64b disposed on the side of the light source part 61 (direction perpendicular to the Z direction).

Here, the lenses 62a to 62d have shapes differing from each other, and are configured so that the distribution characteristics (emission direction of light) differ from each other. As a result, the lenses 62a to 62d differ from each other in emission direction of light, and are configured to irradiate light to the differing reflective regions A1 to A4 of the reflective sheet 5.

As illustrated in FIGS. 5(a) to 5(d), the lenses 62a to 62d are disposed to be aligned in the X direction adjacent to each other. Furthermore, the lenses 62a to 62d are configured to irradiate light to the reflective regions A1 to A4 so that the reflective regions A1 to A4 do not substantially overlap each other.

As illustrated in FIG. 3, the television device 100 is provided with a unit configuration U including a light emitting part group G1 having one of each of the light emitting parts 6a to 6d aligned adjacent to each other in the width direction (X direction), and a reflective region group G2 having one by one the reflective regions A1 to A4 where the light emitting part group G1 is disposed directly below (Z2 direction). Note that the reflective region group G2 is a group of the reflection regions A1 to A4 aligned in the vertical direction (Z direction), and the light emitting part groups G1 is a group of light sources (light emitting parts 6a to 6d) for irradiation light to one of the reflective region group G2. Furthermore, the unit configuration U is disposed in the television device 100 to be aligned in plurality (4) in the width direction (X direction). Therefore, the reflective regions A are disposed in a matrix of 4 rows and 4 columns in the surface direction parallel to the display surface 10 of the display part 1 (vertical direction (Z direction) and width direction (X direction)).

The substrate 7 has a flat shape extending linearly in the width direction (X direction). The light emitting parts 6a to 6d are installed on the upper surface (surface on Z1 direction side) of the substrate 7.

One or more of the following effects can be obtained in one or more embodiments of the invention.

According to one or more embodiments of the invention, light emitting parts 6a to 6d disposed near the lower end part 5a of the reflective sheet 5 and a control part 3 for carrying out a control to adjust the amount of light generated by each light emitting part 6a to 6d are provided so that it is possible to irradiate light to reflective regions A differing from each other in the reflective sheet 5. As a result, because it is possible to irradiate light from the light emitting parts 6a to 6d to reflective regions A differing from each other, it is possible to adjust the irradiation (amount) of light for each reflective region A1 to A4 by adjusting the amount of light generated in each light emitting part 6a to 6d using the control part 3. As a result, it is possible to adjust the brightness of each display surface 10 in a predetermined range of the display part 1 corresponding to each reflective region A1 to A4. That is, it is possible to carry out a local dimming control.

Furthermore, the light emitting parts 6a to 6d are configured to irradiate light to the reflective regions A so that the reflective regions A do not substantially overlap each other. As a result, it is possible to adjust the irradiation (amount) of light in the reflective region A with little influence on the light from other adjacent reflective regions. As a result, it is possible to carry out a more effective local dimming control.

Furthermore, the reflective sheet is configured so that the light emitted from the light emitting parts 6a to 6d irradiates to the reflective regions A of the reflective sheet 5 via a space without passing through a light guide plate. As a result, the device configuration can be simplified because the television device 100 is not provided with a light guide plate.

Furthermore, the reflective sheet 5 is inclined from the lower end part 5a of the reflective sheet on the light emitting part 6a to 6d side towards the upper end part 5b on the opposite side of the lower end part 5a to be closer to the display part 1. As a result, compared to when the reflective sheet 5 is disposed parallel to the display surface 10, because the reflective sheet 5 can be disposed to face the light emitting part 6a to 6d side, it is possible to easily irradiate light from the light emitting parts 6a to 6d to the reflective regions A and to effectively reflect light to the display part 1 side.

Furthermore, the reflective region A is disposed in a matrix shape in a surface direction parallel to the display surface 10 of the display part 1, and a unit configuration U is disposed in plurality in the first direction, which includes a reflective region group G2 composed of a plurality of reflective regions A aligned in the second direction perpendicular to the first direction, in which the lower end part 5a of the reflective sheet 5 on the light emitting parts 6a to 6d side in the surface direction extends; and a light emitting part group G1 disposed near the lower end part 5a of the reflective region group G2 and composed of light emitting parts 6a to 6d irradiating light to the reflective region group G2. As a result, because the unit configuration U is disposed in plurality in the first direction to carry out a local dimming control, it is possible to similarly adjust each unit configuration U. Therefore, it is possible to effectively suppress variation in the brightness and darkness (bright and dark) in the display surface 10.

Furthermore, the light source part 61 for generating light and the lenses 62a to 62d for guiding light from the light source part 61 to the reflective sheet 5 are provided to the light emitting parts 6a to 6d. As a result, because it is possible to easily change the direction of light from the light source part 61 using the lenses 62a to 62d, the light emitting parts 6a to 6d can easily emit light toward the reflective regions A, which are different from each other.

Furthermore, the light emitting parts 6a to 6d are configured to irradiate light to the differing reflective regions of the reflective sheet 5 in which the emission direction of light can be made to differ by varying the distribution characteristic of the lenses 62a to 62d from each other with respect to the light source part 61. As a result, when the distribution characteristic of the lenses 62a to 62d are made to differ with respect to the light source part 61, from a design viewpoint, it is possible to dispose each light emitting part 6a to 6d in a similar position. Furthermore, when the installation angles of the light emitting parts 6a to 6d themselves are made to differ from each other, it is possible irradiate light to reflective regions A which differ from each other using the light emitting parts 6a to 6d having a similar configuration. As a result, it is possible to simplify the configuration of the light emitting parts 6a to 6d.

Furthermore, a collimator lens is provided in the lenses 62a to 62d for making substantially parallel light by reflecting and refracting light from the light source part 61. As a result, it is possible to easily obtain substantially parallel light using a collimator lens. Thus, the light emitting parts 6a to 6d can emit light so that light substantially fits in a predetermined reflection region A.

Next, further embodiments will be described with reference to FIG. 1 and FIGS. 6(a)-6(d). In these embodiments, an example will be described configured so that the emission direction of light is made different by making the shape of the light emitting parts 6a and 6b different (making the distribution characteristics different), making the emission direction of light different by making the installation angle of light emitting parts 206a and 206b themselves different, which differs from the aforementioned embodiments in which light is irradiated to differing reflective regions A1 to A4 of the reflective sheet 5, and for irradiating light to differing reflective regions A1 to A4 of the reflective sheet 5. Note that in a television device 200 (see FIG. 1) of these embodiments, similar to the embodiments described above, the unit configuration U is disposed aligned in plurality (4) in the horizontal width direction (X direction). The following description describes one unit configuration U and omits description of other unit configurations U.

As illustrated in FIGS. 6(a)-6(d), the television device 200 (see FIG. 1) has light emitting parts 206a to 206d.

Each of the light emitting parts 206a to 206d has a configuration similar to that of the light emitting parts 6a to 6d of the embodiments described above.

As illustrated in FIG. 6(a), the light emitting part 206a has the light source part 61 (LED package) for generating light and lenses 262 for guiding light from the light source part 61 to the reflective sheet 5. The lenses 262 include a recess 263 for disposing the light source part 61 on the substrate 7 side. The recess 263 is disposed on the central axis line a extending in the Z direction of the lens 262. That is, although not illustrated, the light source part 61 is disposed in the center of the lens 262 as viewed from the direction in which the central axis line a extends. As a result, as illustrated in FIG. 6(a), the light emitting part 206a is configured to irradiate light to the top of the light emitting part 206a along the central axis line a. Note that the light emitting parts 206b to 206d have a configuration similar to the light emitting part 206a.

The light emitting parts 206a to 206d are configured to irradiate light to differing reflective regions of the reflective sheet 5 in which the emission direction of light is made different by making the installation angle of the light emitting parts 206a to 206d themselves different from each other. Each of the light emitting parts 206a to 206d is configured to irradiate light to reflective regions A1 to A4.

Other configurations are similar to the embodiments described above.

One or more of the following effects can be obtained in one or more embodiments of the invention.

According to one or more embodiments of the invention, the light emitting parts 206a to 206d are configured to irradiate light to differing reflective regions A of the reflective sheet 5 in which the emission direction of light is made different by making the installation angle of the light emitting parts 206a to 206d themselves different from each other. Thus, it is possible to irradiate light to reflective regions A that differ from each other using similarly configured light emitting parts 206a to 206d. As a result, the configuration of the light emitting parts 206a to 206d can be simplified.

Other effects may be similar to one or more of the embodiments described above.

Next, further embodiments will be described with reference to FIG. 1 and FIGS. 7(a)-7(b). In these embodiments, an example will be described in which light emitting parts 306a and 306b (306c and 306d) are disposed aligned in plurality (2) in the longitudinal direction (Y direction, direction perpendicular to the display surface 10 (see FIG. 2) of the display part 1), which differs from the embodiments described above in which one light emitting part 6a or 6b is disposed (disposed in one row) in the longitudinal direction (Y direction). Note that in a television device 300 (see FIG. 1), similar to the embodiments described above, the unit configuration U is disposed aligned in plurality (4) in the width direction (X direction). The following description describes one unit configuration U and omits description of other unit configurations U.

As illustrated in FIGS. 7(a)-7(b), the television device 300 (see FIG. 1) has light emitting parts 306a to 306d.

Each of the light emitting parts 306a to 306d has a configuration similar to that of the light emitting parts 6a to 6d of the embodiments described above. The light emitting parts 306a and 306b are disposed aligned in the longitudinal direction (Y direction). Furthermore, the light emitting part 306a is disposed on the rear side (Y2 direction side) of the light emitting part 306b. Similarly, the light emitting parts 306c and 306d are disposed aligned in the longitudinal direction (Y). Furthermore, the light emitting part 306c is disposed on the rear side (Y2 direction side) of the light emitting part 306d. The light emitting parts 306c and 306d are disposed adjacent to one side (X1 direction side) of the width direction of the light emitting parts 306a and 306b. Note that the light emitting parts 306c and 306d may be disposed adjacent to the other side (X2 direction side) of the width direction of the light emitting parts 306a and 306b.

Each of the light emitting parts 306a to 306d is configured to irradiate light to the reflective regions A1 to A4.

Other configurations are similar to the embodiments described above.

One or more of the following effects can be obtained in one or more embodiments of the invention.

According to one or more embodiments of the invention, the light emitting parts 306a to 306d are provided aligned in plurality in the direction perpendicular to the display surface 10 of the display part 1. As a result, in the direction perpendicular to the display surface 10 of the display part 1, it is possible to configure the television device 300 to irradiate light from one light emitting part near the reflective sheet 5 to the reflective region A near one light emitting part and to irradiate light from another light emitting part far from the reflective sheet 5 to the reflective region A far from another light emitting part. Thus, compared to when irradiating light from one light emitting part near the reflective sheet 5 to the far reflective region A and irradiating light from another light emitting part far from the reflective sheet 5 to the near reflective region, it is possible to reduce the difference between the angle of incidence of light incident on the reflective sheet 5 from one light emitting part and the angle of incidence of light incident on the reflective sheet 5 from another light emitting part. Thus, it is possible to uniformly guide light reflected from the reflective region A to a predetermined range on the display surface 10.

Other effects may be similar to the embodiments described above.

Next, further embodiments will be described with reference to FIG. 1 and FIG. 8. In these embodiments, an example will be described in which light emitting parts 406a and 406b are configured to emit light in a direction substantially parallel to each other, which differs from the aforementioned embodiments wherein the light emitting parts 6a and 6b are configured to emit light in different directions.

Figure 8:
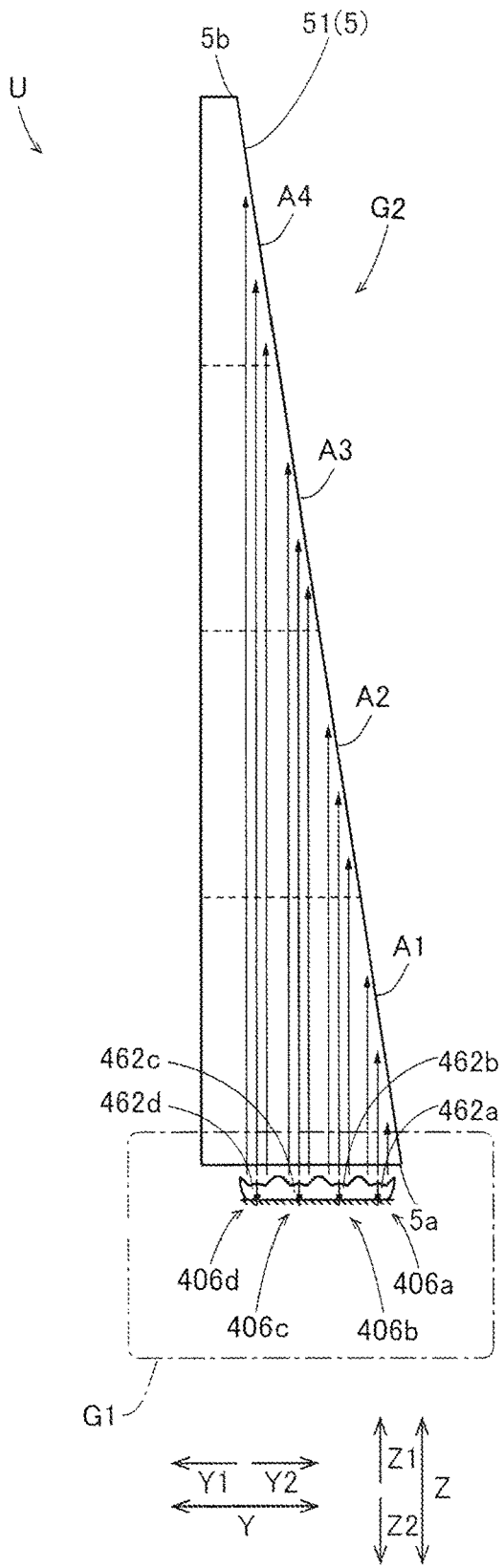
FIG. 8 is a side surface view illustrating the distribution characteristics of each of the plurality of light emitting parts of the television device according to one or more embodiments of the present invention.

As illustrated in FIG. 8, a television device 400 (see FIG. 1) has light emitting parts 406a to 406d.

Each of the light emitting parts 406a to 406d has the light source part 61 and lenses 462a to 462d that emit light from the light source part 61 in the Z direction substantially parallel to the display surface 10. In other words, the light emitting parts 406a to 406d emit light in directions parallel to each other. Furthermore, each of the light emitting parts 406a to 406d is disposed so that the central axis line a of the lenses 462a to 462d extend in the vertical direction (Z direction). Furthermore, the lenses 462a to 462d are integrally formed by being connected to each other in the longitudinal direction (X direction).

Each of the light emitting parts 406a to 406d is configured to irradiate light to the reflective regions A1 to A4.

Other configurations are similar the embodiments described above.

One or more of the following effects can be obtained in one or more embodiments of the invention.

According to one or more embodiments of the invention, each of the light emitting parts 406a to 406d is configured to emit light in a direction substantially parallel to the display surface 10 of the display part 1. As a result, the light reflected from the reflective region A can be more uniformly guided to a predetermined range on the display surface 10 because the angle of incidence to the reflective sheet 5 of light emitted from the light emitting parts 406a to 406d can be aligned.

Light emitting parts 406a to 406d include the light source part 61 for generating light and the lenses 462a to 462d for guiding the light from the light source part 61 to the reflective sheet 5; and the lenses 462a to 462d of the light emitting parts 406a to 406d are integrally formed by being connected to each other in a direction perpendicular to the display surface 10 of the display part 1. As a result, the device configuration can be simplified because the lenses 462a to 462d of the light emitting devices 406a to 406d can be integrally formed.

Other effects may be similar to the embodiments described above.

Next, further embodiments will be described with reference to FIG. 1 and FIG. 9. In these embodiments, an example will be described in which light emitting parts 506a and 506b are disposed both near the lower end part and the upper end part of a reflective sheet 505, which differs from the embodiments in which the light emitting parts 306a and 306b are disposed only near the lower end of the reflective sheet 5.

Figure 9:
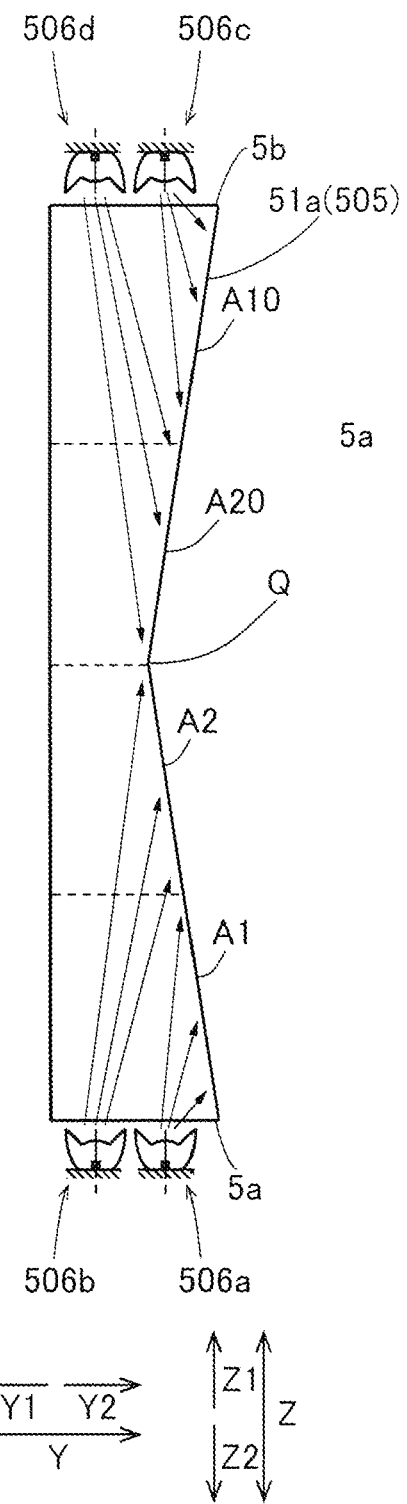
FIG. 9 is a side surface view illustrating the distribution characteristics of each of the plurality of light emitting parts of the television device according to one or more embodiments of the present invention.

As illustrated in FIG. 9, a television device 500 (see FIG. 1) has the light emitting parts 506a to 506d and the reflective sheet 505.

Each of the light emitting parts 506a and 506b and the light emitting parts 506c and 506d is provided on the lower side (one side) and upper side (other side) of the end parts facing each other of the reflective sheet 505 in the vertical direction (Z direction). The light emitting part 506a and the light emitting part 506c have configurations similar to the light emitting part 306a in the embodiments described above. Furthermore, the light emitting part 506b and the light emitting part 506d have configurations similar to the light emitting part 306b in the embodiments described above. Note that the light emitting part 506a and the light emitting part 506b are an example of the "a plurality of light emitters" according to one or more embodiments of the present invention, and the light emitting part 506c and the light emitting part 506d are an example of "another plurality of light emitters" according to one or more embodiments of the present invention.

The reflective sheet 505, as viewed from the width direction (X direction), has a sheet form in which an intermediate position Q of the vertical direction (Z direction) (the center of the reflective sheet 505) projects forward (i.e., toward the display screen), which is different from the embodiments described above. Furthermore, the reflective sheet 505 has reflective regions A10 and A20 above the intermediate position Q, and also has the reflective regions A1 and A2 below the intermediate position Q.

Each of the light emitting parts 506a to 506d is configured to irradiate light to the reflective regions A1, A2, A10, and A20.

The light emitting parts 506a and 506b and the light emitting parts 506c and 506d are configurations symmetric in the vertical direction. Furthermore, the reflective sheet 505 is a configuration symmetrical with respect to the intermediate position Q in the vertical direction.

Other configurations are similar to the embodiments described above.

One or more of the following effects can be obtained in one or more embodiments of the invention.

According to one or more embodiments of the invention, as described above, the light emitting parts 506a and 506b are provided disposed on one side of the ends facing each other of the reflective sheet 5 and the light emitting parts 506c and 506b disposed on the other side. As a result, compared to when the light emitting parts are provided only on one side of the ends facing each other of the reflective sheet 5, it is possible to shorten the maximum light guiding distance from the light emitting parts 506a and 506b and the light emitting parts 506c and 506d to the reflective region A. Therefore, it is possible to suppress energy loss in the light.

Other effects may be similar to the embodiments described above.

Next, further embodiments will be described with reference to FIG. 10. In these embodiments, in addition to the configuration of the embodiments described above, an example in which a reflective sheet 605 has a partition wall 654 will be described.

Figure 10:
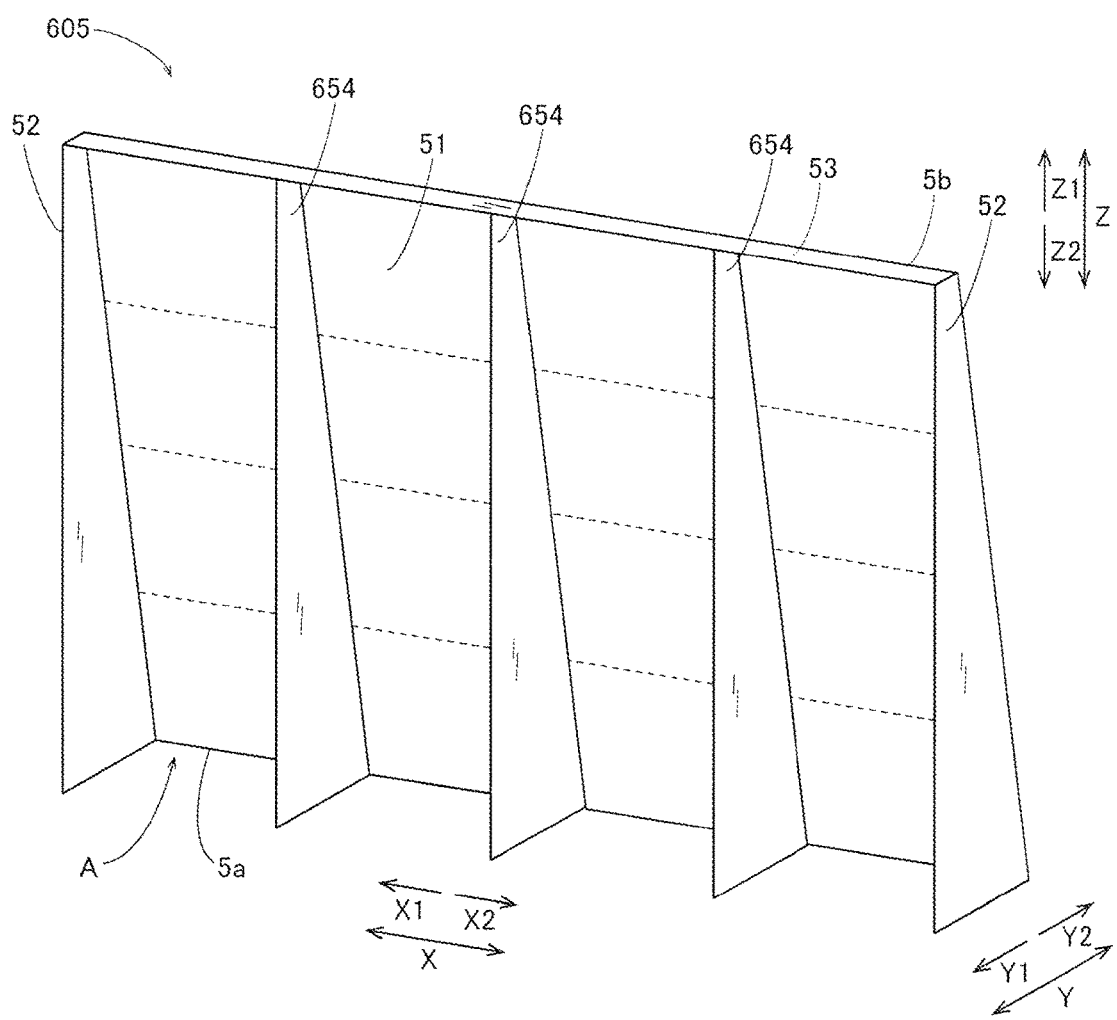
FIG. 10 is a perspective view illustrating the reflective sheet of the television device according to one or more embodiments of the present invention.

As illustrated in FIG. 10, a television device 600 (see FIG. 1) has the reflective sheet 605.

The reflective sheet 605 includes the partition wall 654. The partition wall 654 extends from the reflective sheet main body 51 toward the display part 1 (see FIG. 1) and extends from the light emitting parts 6a to 6d (see FIG. 3) along an emission direction of light. Furthermore, the partition wall 654 is provided in plurality (3) at predetermined intervals in the X direction. The partition wall 654 divides the reflective region A of the reflective part in plurality (4) in the X direction.

Other configurations are similar to the embodiments described above.

One or more of the following effects can be obtained in one or more embodiments of the invention.

According to one or more embodiments of the invention, as described above, the reflective sheet 605 is disposed along the display part 1; and is provided with the reflective sheet main body 51 that reflects light to the display part 1 side, and the partition wall 654 that extends from the reflective main body 51 toward the display part 1, extends from the light emitting parts 6a to 6d along an emission direction of light, and divides the reflective region A of the reflective sheet 605. As a result, the light flow to the reflective region A on the other side from the reflective region A on one side of the partition wall 654 can be suppressed using the partition wall 654.

Other effects may be similar to the embodiments described above.

[Variation]

Note that in the embodiments disclosed herein, it should be considered that all points are examples and that they are not restrictive. The scope of the present invention is not shown by the description of the embodiments described above but by the scope of claims, and furthermore, all changes (variations) in meanings and scope equivalent to the scope of claims are included.

For example, in the embodiments described above, examples are shown in which the present invention was applied to a television device, but the present invention may be applied to a display device other than a device.

Furthermore, in the embodiments described above, examples are shown in which the light emitting part is disposed on the upper end part or lower end part of the reflective sheet, but the present invention is not limited to this. In the present invention, the light emitting part may be installed on the width direction end part of the reflective sheet.

Furthermore, in the embodiments described above, an example is shown in which the light emitting part itself is inclined, but the present invention is not limited to this. In the present invention, the substrate on which the light emitting part is disposed may be inclined, rather than the light emitting part.

Furthermore, in the embodiments described above, examples are shown in which the reflective region is disposed in a matrix of 4 rows and 4 columns, but the present invention is not limited to this. In the present invention, the reflective region may be disposed in a matrix other than that of 4 rows and 4 columns such as 5 rows and 5 columns.

Furthermore, in the embodiments described above, examples are shown which are configured to irradiate light from one light emitting device to one reflective region, but the present invention is not limited to this. In the present invention, light may be irradiated from a plurality of the light emitting device to one reflective region.

Furthermore, in one or more of the embodiments described above, examples are shown which use a sheet-shaped reflective sheet 5 as the "reflective sheet," but the present invention is not limited to this. In one or more embodiments of the present invention, a reflective part of a shape other than a sheet may be used. In this case, the reflective surface of the reflective part (surface of the display part side) may be inclined from one end of the reflective part of the light emitting part side toward the other end on the opposite side of the one side so as to be near the display part.

Furthermore, in the embodiments described above, examples are shown in which the television device does not have a light guide plate, but the present invention is not limited to this. In one or more embodiments of the present invention, the television display may have a light guide plate.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF REFERENCE SYMBOLS

1 Display (display screen)
3 Control part (controller)
5, 605 Reflective sheet
5a Lower end part (one side)
5b Upper end part (opposite side)
6a,6b, 6c, 6d, 206a, 206b, 206c, 206d, 306a, 306b, 306c, 306d, 406a, 406b, 406c, 406d Light emitting part (light emitter)
10 Display surface
51 Reflective sheet main body (main body)
61 Light source part (light source)
62a, 62b, 62c, 62d, 262, 462a, 462b, 462c, 462d Lens
506a, 506b Light emitting part (first light emitter)
506c, 506d Light emitting part (second light emitter)
654 Partition wall
100, 200, 300, 400, 500, 600 Television device (display device)
A, A1, A2, A3, A4 Reflective region
G1 Light emitting part group (second group of light emitters)
G2 Reflective region group (first group of reflective regions)
U Unit configuration (set of G1 and G2)

What is claimed is:

1. A display device, comprising:
a display screen;
a reflective sheet disposed opposite the display screen and that reflects irradiated light toward the display screen;
a plurality of light emitters disposed at one side of the reflective sheet and that irradiates light to different reflective regions of the reflective sheet; and
a controller that adjusts a total amount of light generated in each of the light emitters,
wherein an entirety of a first reflective region that comprises all portions irradiated by a first light emitter of the plurality of light emitters is farther from the one side than an entirety of a second reflective region that comprises all portions irradiated by a second light emitter adjacent to the first light emitter.

2. The display device according to claim 1, wherein the reflective regions irradiated by the plurality of light emitters do not overlap each other.

3. The display device according to claim 1, wherein the plurality of light emitters irradiates the light toward the reflective regions via a space without passing through a light guide plate.

4. The display device according to claim 3, wherein the reflective sheet is inclined from the one side of the reflective sheet toward an opposite side of the reflective sheet to approach the display screen.

5. The display device according to claim 3,
wherein the reflective sheet is disposed along the display screen, and
wherein the reflective sheet comprises:
a main body that reflects light toward the display screen; and
a partition wall that defines the reflection regions and that extends from the main body towards the display screen and extends from the plurality of light emitters along an emission direction of the light.

6. The display device according to claim 1, wherein the reflective regions are disposed in a grid pattern on the reflective sheet.

7. The display device according to claim 6,
wherein the display device comprises one or more sets of:
a first group of the reflective regions aligned in a first direction perpendicular to a second direction in which the plurality of light emitters is disposed along the one side of the reflective sheet; and
a second group of the light emitters that irradiates light to the first group of the reflective regions.

8. The display device according to claim 7,
wherein each of the light emitters comprises:
a light source that generates light; and
a lens that guides the light from the light source to the reflective sheet, and
wherein the plurality of light emitters varies a direction of light emission by respectively varying light distribution characteristics of the lens to the light source.

9. The display device according to claim 8,
a total number of the reflective regions included in the first group is equal to a total number of the light emitters included in the second group, and
the light emitters of the second group respectively irradiate different reflective regions of the first group.

10. The display device according to claim 7,
wherein each of the light emitters comprises:
a light source that generates light, and
a lens that guides the light from the light source to the reflective sheet, and
wherein the plurality of light emitters varies a direction of light emission by respectively varying installation angles of the light emitters.

11. The display device according to claim 7, wherein each first group of the one or more sets is separated by a partition wall that extends from the reflective sheet towards the display screen and extends along a light emission direction of the plurality of light emitters.

12. The display device according to claim 1, wherein the plurality of light emitters is aligned along the one side of the reflective sheet.

13. The display device according to claim 12, wherein the plurality of light emitters irradiates light in a direction substantially parallel to the display screen.

14. The display device according to claim 12,
wherein each of the light emitters comprises:
a light source that generates light, and
a lens that guides the light from the light source to the reflective sheet, and
the lenses of the plurality of light emitters are integrated and connected to each other in a direction perpendicular to the display screen.

15. The display device according to claim 1, further comprising another plurality of light emitters disposed at the opposite side of the reflective sheet.

16. The display device according to claim 15, wherein the reflective sheet is inclined from both the one side and the opposite side of the reflective sheet toward a center of the reflective sheet to approach the display screen.

* * * * *